No. 771,043. PATENTED SEPT. 27, 1904.
W. E. CAMPBELL.
EGG TURNER FOR INCUBATORS.
APPLICATION FILED JAN. 9, 1904.
NO MODEL.
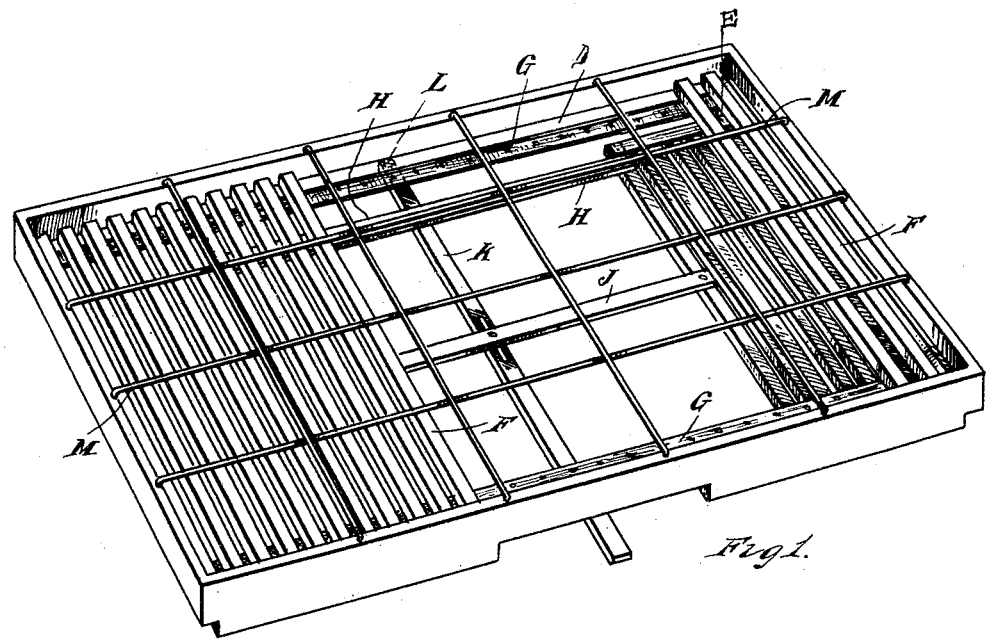
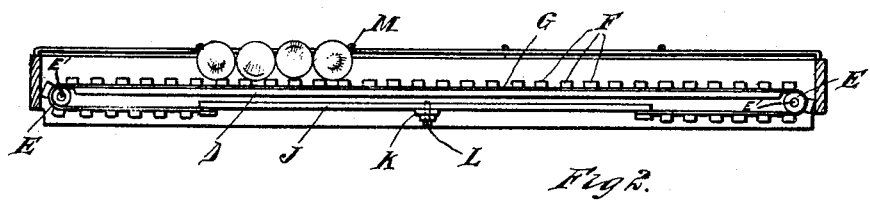
WITNESSES
T. G. Massey
Lotta Lee Hayton.
INVENTOR
William E. Campbell
By Parker & Burton Attorneys.

No. 771,043. Patented September 27, 1904.

UNITED STATES PATENT OFFICE.

WILLIAM E. CAMPBELL, OF DETROIT, MICHIGAN.

EGG-TURNER FOR INCUBATORS.

SPECIFICATION forming part of Letters Patent No. 771,043, dated September 27, 1904.

Application filed January 9, 1904. Serial No. 188,309. (No model.)

*To all whom it may concern:*

Be it known that I, WILLIAM E. CAMPBELL, a subject of the King of Great Britain, residing at Detroit, county of Wayne, State of Michigan, have invented a certain new and useful Improvement in Egg-Turners for Incubators; and I declare the following to be a full, clear, and exact description of the invention, such as will enable others skilled in the art to which it pertains to make and use the same, reference being had to the accompanying drawings, which form a part of this specification.

My invention relates to egg-turners for incubators, and has for its object greater accuracy in the periodical turning of the eggs during the course of incubation, and to this end consists in the combinations and appliances hereinafter described and set forth.
In the accompanying drawings, Figure 1 is a view from above, showing the relation of the outer frame, the lattice-work for separating the eggs from each other, and the movable and flexible tray or floor for supporting the eggs. Fig. 2 is a vertical cross-section with side piece of the outer frame removed, showing details of operation.

The device embodying the invention has a rectangular frame of any desired dimensions, which is intended to be placed in a horizontal position in the incubator. Along the inside of the sides of said frame and at a suitable distance from the top are strips or moldings D, which extend nearly the whole length of the sides, but terminate shortly before reaching the ends of the frame. Extending from the ends of said strips across the frame to the corresponding end of the opposite strip or molding are cross-beams E', secured thereto and performing the double office of further strengthening the outer frame and of supporting, preferably near each point of union with said strips, rollers E on an axis parallel with said beams, whose purpose and function will be hereinafter indicated. Resting upon and supported by said strips and extending as completely from one side of said frame to the other as is consistent with the desired mobility hereinafter referred to is a support-
ing floor or bottom F, composed of strips of wood or other suitable material lying parallel to one another and with spaces between, each of which is attached near each end to belts G or straps of suitable flexibility, which running lengthwise of said frame engage and pass around the rollers E on the cross-beam hereinabove referred to. These straps or belts are continued around the rollers and brought together beneath the floor or support formed by the strips. To the parts of the belts thus brought under the frame the strips are also attached in the same manner as those above referred to. The ends of the straps or belts, with the attached slats, as brought beneath the floor of said frame do not extend under the entire length, but terminate at a suitable distance from each other. Their ends are united by arms or slats H, preferably of wood or other rigid material. The last slat at each end of the belts to which the said arms are joined should be somewhat heavier than the others. At about the center of each of these last cross-slats is attached another arm, J, similar to those just described and preferably parallel thereto. To this is slidably pivoted near its center a lever K, extending across the frame, one end being pivoted thereto at L. By moving the free end of said lever the entire supporting-floor is actuated and moved in either direction desired, the straps or belts, with their slats attached, moving freely over and around the rollers hereinabove referred to. Extending over the top of the frame and at a suitable distance above the slatted floor is a lattice-work M of any desired size of mesh, whose purpose and object is the separation of the eggs into groups of suitable size both when at rest and when rolling.

I am aware of a device now in use which has the supporting-floor fixed and immovable and in which the eggs are shifted by moving the lattice-work. Experience has shown that such a device fails to accomplish its purpose in that by the movement of the lattice-work the eggs are shoved, not rolled. I am also aware of devices in which the eggs are shifted by an undulatory movement of the supporting-bottom. In both these forms a large portion of the space of the case is not used, and in the latter case the eggs are crowded into masses with vacant spaces.

What I claim is—

1. In an egg-turner for incubators, the combination of an outer frame, a superposed lattice-work, a movable bottom, composed of bars with spaces intervening, belts whereon said bars are mounted and rest, and which terminate beneath said movable bottom, rollers whereon said belts travel, and a lever to actuate the belts, substantially as described.

2. In an egg-turner, the combination of a frame with ledges extending part of its length on the inside faces, a superposed lattice-work, a movable bottom of bars with alternating spaces between them, belts whereon said bars are attached and rest, and whose ends extend beneath said bottom, rollers whereon said belts move, and an actuating-lever connected to the ends of said movable bottom, substantially as described.

3. In a device of the class described, the combination of an outer frame with moldings along a portion of its length on the inside, a superposed lattice-work, a slatted, flexible, movable floor each end of which turns and extends beneath the main portion thereof, rollers whereon said floor rests and moves and an actuating-lever connected with the ends of said movable floor, substantially as described.

4. In a device of the class described, the combination of a containing-frame with inner moldings along a portion of its length, a superposed lattice-work, a movable, slatted bottom, belts whereon said bottom is mounted and terminating beneath it, rollers over which said belts travel, said bottom being supported in part by said moldings and in part by said rollers, and an actuating-lever connected to the ends of said bottom, substantially as described.

5. In an egg-turner, the combination of an outer frame, with supporting-moldings along a portion of its inside length, supporting-rollers at each end, a slatted movable floor, supporting-belts on which said floor is mounted, rollers at each end around and over which said floor passes as the ends move beneath the main section thereof, an actuating-lever connected to said ends, and means for separating the eggs into groups, substantially as described.

6. In an egg-turner, the combination of an outer casing whose sides are provided along the central part of their inner faces with moldings, transverse rollers near each end, a superposed lattice-work, a movable flexible floor resting upon and traveling around said rollers, and terminating beneath the main portion of said floor, and an actuating-lever connected to the ends of said floor, substantially as described.

7. In an egg-turner, the combination of an outer frame with rollers near each inside end, a superposed lattice-work, a movable floor with slatted surface revolving around said rollers and extending beneath said floor, belts supporting and connected to the same, and an actuating-lever connected to the ends of said floor, substantially as described.

8. In an egg-turner, the combination of an outer frame with transverse rollers near each inside end, a movable, flexible floor revolving around said rollers and turning at each end beneath said floor, an actuating-lever connected to the ends of said floor, and suitable compartments for containing eggs above and not connected with said floor, substantially as described.

In testimony whereof I sign this specification in the presence of two witnesses.

WILLIAM E. CAMPBELL.

Witnesses:
CHARLES F. BURTON,
ELLIOTT J. STODDARD.